Feb. 21, 1950     C. W. HOPKINS     2,498,163
METHOD OF GRINDING NONCIRCULAR SECTIONS
Filed Jan. 6, 1947     2 Sheets-Sheet 2
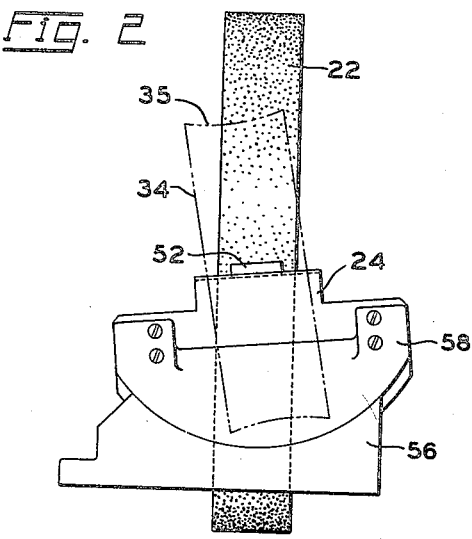
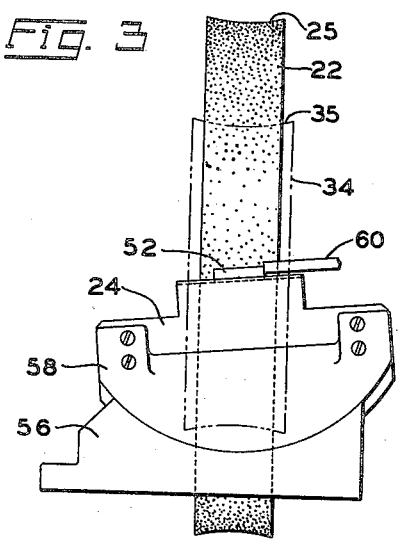
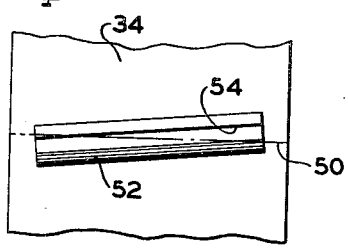
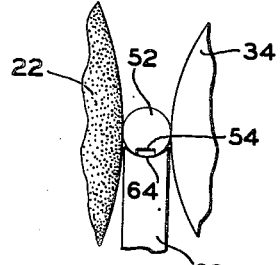
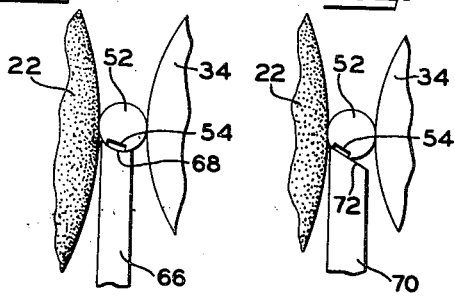
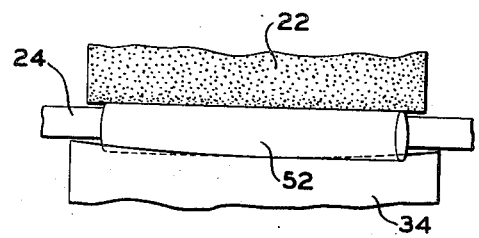
Inventor
CECIL W. HOPKINS
By Strauch & Hoffman
Attorneys Patented Feb. 21, 1950

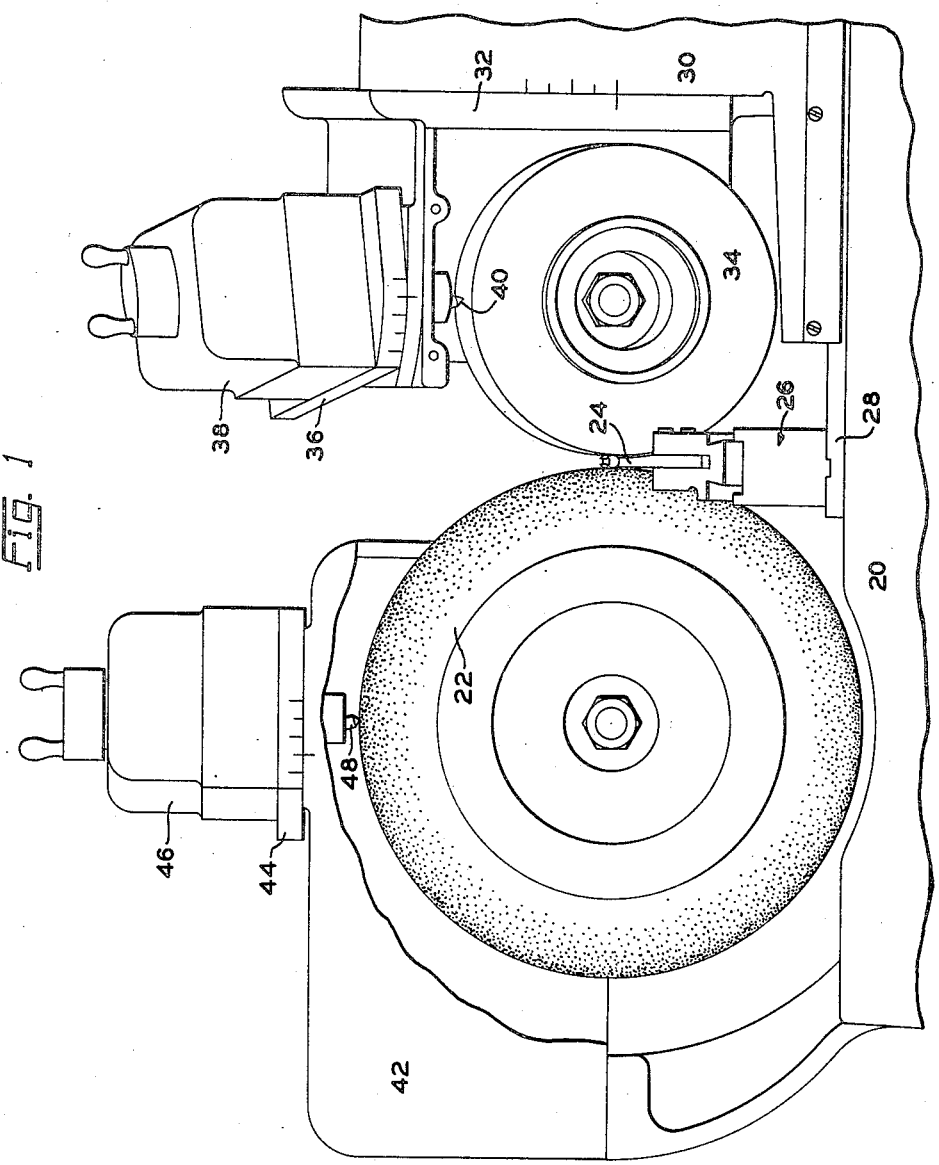

2,498,163

UNITED STATES PATENT OFFICE 2,498,163

METHOD OF GRINDING NONCIRCULAR SECTIONS

Cecil W. Hopkins, Waynesboro, Pa., assignor to Landis Machine Company, Waynesboro, Pa., a corporation of Pennsylvania Application January 6, 1947, Serial No. 720,362

3 Claims. (Cl. 51—289)

This invention relates to centerless grinding machines and particularly to a method of using such machines for grinding cylindrical or conical surfaces which are interrupted by longitudinal formations such as flats, keyways, etc.

The construction and operation of the centerless grinding machine are well understood by those skilled in the art. Briefly, the principal elements of the machine are a grinding wheel mounted on a horizontal shaft or spindle, a control wheel having its periphery opposed to that of the grinding wheel and having an inclinable axis, and a work-rest for supporting the work-piece between the two wheels.

In the customary method of using such a machine for grinding cylindrical work, the work rest is set so that the axis of the work-piece is substantially parallel to the axis of the grinding wheel. In the method known as through-feed grinding, the axis of the control wheel is inclined relative to the axis of the work-piece to produce a feeding action which causes the work-piece to move axially between the wheels. In the method known as in-feed grinding, the axis of the control wheel is maintained substantially parallel to the axis of the work-piece and very little or no axial movement of the work-piece results.

In either case, it has been found that the continuous contact of the work-piece with grinding wheel, control wheel and work-rest is essential for the production of accurately ground cylindrical work. Consequently, the centerless grinding of parts having a cylindrical surface interrupted by one or more longitudinal flats, keyways, splines or similar formations, has not been feasible because in previous machines of this class it was not possible to keep the surface of the work-piece in continuous contact with the grinding wheel, regulating wheel and work-rest simultaneously. Additionally, parts having such non-circular sections throughout their length, could not continuously rotate at uniform speed according to the peripheral speed of the control wheel and uneven axial travel of the work-piece took place, causing the surface of the work-piece to be irregular, inaccurate and scarred.

It is therefore an object of this invention to provide a method of centerless grinding whereby pieces having cylindrical or conical surfaces interrupted circumferentially may be properly and accurately ground.

It is another object of the invention to accomplish such grinding by the proper relative arrangement and disposition of the primary parts of a centerless grinding machine.

It is a further object to grind such pieces in a centerless grinding machine whether or not axial feeding of the work-piece is desirable.

It is also an object of this invention to provide a method whereby work-pieces of certain regular or irregular polygonal sections may be reduced to the largest possible cylindrical diameter in a centerless grinding machine.

Other objects and advantages of the invention will be apparent by reference to the following complete description of the invention and to the accompanying drawings.

In the drawings,

Figure 1 is a partial front elevation of a centerless grinding machine arranged according to the invention;

Figure 2 is a semi-diagrammatic side elevation of the grinding wheel, control wheel and work-rest arranged for feeding the work axially;

Figure 3 is similar to Figure 2 but with the parts arranged for no axial feeding of the work;

Figure 4 is a partial side elevation of the control wheel and showing a work-piece in position thereagainst; and Figures 5, 6 and 7 are fragmentary front elevations of the grinding wheel, control wheel and work-rest with permissible variations of the latter; and Figure 8 is a fragmentary plan view showing a work-piece between the working faces of the grinding and control wheels, as in Figure 1.

Figure 1 shows the most important elements of a centerless grinding machine including a bed 20 upon which is mounted, in well-known manner, a grinding wheel 22. Laterally adjacent grinding wheel 22, a work-rest blade 24 is supported in a work-rest adjusting mechanism 26. Said work-rest mechanism is, in turn, mounted on one end of a main slide 28 by means of which it may be advanced toward or withdrawn from the peripheral surface of grinding wheel 22. Main slide 28, which is mounted on the bed 20, provides a seating surface for a control wheel slide 30 to one side of which the control wheel housing 32 is rockably secured. In the drawing the front cover of housing 32 has been removed in order to clearly show the control wheel 34 which is mounted therein in the usual manner.

To the top surface of the control wheel housing 32 the dresser slide 36 is pivotally secured for limited rotation about a vertical axis which lies in the same vertical plane as the center of rocking movement of the control wheel 34 and the center of rocking movement of the work-rest blade 24. A dresser mechanism 38 is mounted for longitudinal reciprocating movement on slide 36. The vertically adjustable diamond dressing tool 40 associated with dresser mechanism 38 is reciprocated thereby across the face of control wheel 34. Since the construction of such dressing mechanism is familiar to those skilled in the art, no further detailed showing is deemed necessary.

A grinding wheel cover 42, mounted on bed 40.

supports a second dresser slide 44 and dresser mechanism 46, which in similar manner to dresser slide 36, is mounted for limited rotation about a vertical axis which lies in the same vertical plane as the centers of rocking movement of control wheel 34 and work-rest blade 24. Dresser mechanism 46 reciprocates longitudinally of said slide to cause the attached diamond dressing tool 48 to traverse the width of the periphery of grinding wheel 22.

Figure 4 shows a portion of the peripheral surface of the control wheel 34 an element 50 of which is shown perpendicular to both side surfaces thereof or parallel to the wheel axis. A work piece 52 is also shown super-imposed upon the representation of the control wheel 34 as it would be seen from the direction of grinding wheel 22 with the latter removed. It will be noted that the axis of work-piece 52 is inclined relative to the element 50 as is customary when it is desired to create an axial movement of work-piece 52. Work-piece 52 is formed with the keyway 54 which extends the entire length of said work-piece and is parallel to the axis thereof.

If the dressing tool 40 is moved across the peripheral surface of control wheel 34 along the element 50, said control wheel becomes a right cylinder by virtue of the fact that all its elements are parallel to the axis thereof. Since two such cylinders with their axes inclined relative to the work-piece axis have only one common point of tangency, control wheel 34 would then make contact with work-piece 52 at one point, the intersection of element 50 and an element of said work-piece. When work-piece 52 revolves so that the keyway 54 is adjacent control wheel 34, this condition of tangency would be lost and contact between control wheel 34 and work-piece 52 would cease, ending, at least temporarily, both the rotary and axial movement of said work-piece.

If, however, dresser slide 36 is swiveled as shown in Figure 1 and the dresser tool 40 is thus moved across the peripheral face of control wheel 34 while said tool is travelling in a path inclined relative to the axis of said wheel, the working face of control wheel 34 becomes a hyperboloid as shown at 35 and element 50 is brought closer to the center of said control wheel at its midpoint than at both ends. In the preferred embodiment, the control wheel is thus contoured to provide an arcuately concave peripheral surface whose radius center lies in a plane normal to the wheel axis and medially bisecting the control wheel. When the angle of inclination of the dresser tool 40 is the same as the relative inclination of the work and control wheel axes, for example 5°, and is in the proper direction as shown in Figure 1, the curve of element 50 is such that tangency between control wheel 34 and work-piece 52 may be obtained throughout the length of element 50 in the rotation of the work-piece. In extreme cases it may be necessary to use a profiling cam in connection with the dresser mechanism 38 to fit a very small or very large diameter work-piece. The construction of such dressing mechanisms having profiling cams is old in the art and need not be further described. The use of such cams has been found especially necessary in the grinding of tapered or conical work-pieces.

It will be seen that if a condition of tangency between control wheel 34 and work-piece 52 exists along line 50, contact between said control wheel and work-piece is never lost since the line 50 bridges the keyway 54 and control wheel 34 will always engage work-piece 52 on some portion of the line 50.

It is therefore apparent that in order to obtain this desirable condition, the work rest blade 24 must be inclined relative to the control wheel so that the angle between the axes of work-piece 52 and control wheel 34 is slightly larger than the angle between the work-piece axis and a line drawn between diagonally opposite corners of the keyway 54. It should be understood that the shape of the void 54 is not important so far as the purposes of this invention are concerned. The above applies equally well for any sort of flat or concave interruption of the cylindrical surface of work-piece 52 leaving axially extending edge portions in parallel or convergent relation to each other.

The above description of the control wheel to be used in the practice of my invention also applies with equal force to the grinding wheel 22 with the exception that, in some cases, it is not necessary to form the peripheral surface of the grinding wheel as a hyperboloid. This is especially true for the through-feed grinding method. In this method, wherein the rough workpiece enters the grinding throat between control and grinding wheels at one side thereof and leaves the throat, finish ground, at the opposite side of said wheels, it is necessary to have a wider space between the wheels at the entrance side, since the work-piece is of a larger diameter at this point. The wider space is provided by a cylindrical grinding wheel when the work-piece is inclined relative to the axis thereof.

For through-feed grinding, therefore, the method I prefer to employ is shown in Figure 2. The work rest mechanism shown therein is that shown and described in my Patent No. 2,417,413, issued March 18, 1947, and comprises the stationary base 56 and the rockable blade carrying member 58 supported by said base. With the grinding wheel 22 in the usual position, that is, with its axis horizontal, the member 58 and work rest blade 24 are rocked so that the top surface of said work rest blade is inclined relative to the axis of the grinding wheel at the required angle as explained above. As an example, this angle will be assumed to be 5° from the horizontal. The axis of the inclinable control wheel is then inclined at an angle of 10° from the horizontal in order to maintain the same relative inclination between the axes of work-piece and control wheel as between the axes of work-piece and grinding wheel. With the working surface 35 of control wheel 34 dressed to a hyperboloid outline, all the above-described conditions for the accurate grinding of a non-circular section are met and the work-piece 52 is caused to travel axially to the left, as seen in Figure 2, by the relative inclination of said work-piece and control wheel 34.

In Figure 3 is shown the relative positions of these elements in the case of infeed grinding where no axial movement of the work-piece is desired. In ordinary grinding, this result is often achieved by maintaining the axes of the work-piece and control wheel in parallel relationship. Since we have seen that relative inclination of work and control wheel is necessary to grind parts which do not have a completely cylindrical surface, such parallel relationship cannot be used. Here, it should be noted, the working surface 25 of the grinding wheel 22 is also formed to a hyperboloid shape as above described, since work-piece 52 does not move axially and a wider space between the wheels is not required at one side thereof.

The work rest blade 24 is again disposed at the same angle as before relative to the grinding wheel 22, but instead of inclining the control wheel still further as in the case of through-feed grinding, I prefer to maintain a parallel relationship between the axes of grinding wheel 22 and control wheel 34. Thus the work-piece 52 is inclined at the same angle relative to the axes of both wheels. The rotation of control wheel 34 then tends to move work-piece 52 axially to the right as seen in Figure 3. Such motion may be prevented by the use of an end stop 60 by which means work-piece 52 is prevented from moving axially in either direction which is the desired condition in infeed grinding.

Figure 5 shows a type of work rest blade 62 for use in grinding work having an incomplete circular section. The top surface of blade 62 is formed circularly concave as at 64, the radius of said surface 64 being slightly greater than that of the work intended to be ground. Thus, the work-piece is free to roll or laterally float within definite limits, a necessary arrangement due to the required lateral movement of the center of the work-piece.

A preferable modification of the above work rest is shown at 66 in Figure 6. Here, also, the work rest blade 66 is formed with a circularly concave top surface 68. In this case, however, the blade is made narrower, the surface 68 being just wide enough to bridge the keyway 54 in the work-piece 52. Blade 66 is kept as close as possible to the grinding wheel 22, with the result that the side edge of surface 68 nearer the grinding wheel 22 is, as shown disposed at a greater elevation than the opposite side so that very little of the horizontal component of the force exerted by the grinding wheel upon the work is absorbed by work rest blade 66. This allows control wheel 34 complete freedom of action on work-piece 52 and is therefore deemed preferable to the form shown in Figure 5, although the latter may sometimes be used.

In Figure 7 is shown the ordinary type of work rest blade, designated by the reference numeral 70, having an inclined plane top surface 72. While such a blade is theoretically inefficient for the purposes of this invention it has been found adequate in a large number of cases provided that the other conditions of my method of grinding are observed. Such a blade as shown in Figure 7 has the advantage of economy of manufacture and should be used wherever possible. The use of either of the various modifications of work rest blade is best determined by experimentation with a specific work-piece.

It should be evident that by the above method of maintaining continuous grinding contact on the periphery of the work-piece with uninterrupted rotation thereof, a work-piece having one or more flat peripheral surfaces, for example, may be reduced by my method to a completely cylindrical shape, since all grinding will take place at the maximum radii at every line of cross section of the work-piece and the diameter thereof will progressively decrease until the flat surfaces are all removed. Of course, where the work-piece is provided with a keyway which must be preserved to a predetermined depth, the finished work-piece when ground to the required diameter remains of the original interrupted cylindrical surface contour.

My above-described method of grinding non-continuous cylindrical surfaces is also capable of being used to accurately grind a body of polygonal section or one having linear surface portions at varying radial distances from its axis, to the required form and dimensions, within the limitations of the machine. That is, the work rest blade and control wheel axis must be relatively inclined far enough to bridge the widest plane surface of the work-piece, so that the grinding wheel, control wheel and work rest will contact the rotating work-piece along the entire length of the opposite edges of said surface. Thus, the sharp corners are ground away and the work-piece gradually assumes cylindrical shape.

All the above considerations apply equally to tapered or conical work-pieces, with obvious slight modifications in the contour of the wheels as will be evident to those skilled in the art of grinding machines.

Thus I have provided a method of using the familiar centerless grinding machine for the grinding of work-pieces of non-circular section, both by the infeed and through-feed grinding methods, enabling these formerly difficult and expensive grinding operations to be accurately executed at a much faster rate than if the grinding had to be done on the slower center type grinder or other conventional type of grinding machine.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. The method of grinding a workpiece having a generally cylindrical peripheral surface of revolution interrupted by at least two circumferentially spaced axially extending edge portions, in a centerless grinding machine, which comprises supporting the workpiece between and in contact with grinding and control wheels of the machine at a predetermined axial inclination with respect to the wheel axes to establish contact along a helix between a concave peripheral surface on the control wheel and the workpiece in a path which, in the rotation of the workpiece, bridges the space between said edge portions of the workpiece and intersects relatively opposite ends thereof, and rotating the grinding and control wheels to maintain constant rotation of the workpiece by the control wheel at uniform speed in contact with the face of the grinding wheel.

2. The method of grinding a generally cylindrical workpiece having a longitudinally extending key-way, in a centerless grinding machine, which comprises supporting the workpiece for axial and rotative movement in the grinding throat of the machine between a grinding wheel and a control wheel having a concave peripheral surface and in axially inclined relation to the axis of the grinding wheel, and rotating said wheels in contact with the workpiece with the axis of the control wheel inclined in the same direction as the workpiece and at a sufficiently greater angle to cause contact between the concave surface of the control wheel and the workpiece along a helix in a path which diagonally bridges the space between opposite side edges of the key-way and intersects the peripheral surface of the workpiece at relative opposite ends of the respective side edges, to thereby maintain a substantially constant ratio of rotative to axial movement of the workpiece by the control wheel.

3. The method of grinding a generally cylindrical workpiece having a longitudinally extending key-way, in a centerless grinding machine, which comprises supporting the workpiece for rotative movement in an axially inclined position in the grinding throat of the machine and at the same angle to the axes of peripherally opposed grinding and control wheels each having a concave peripheral surface contacting the workpiece along a helix, and then rotating said wheels in contact with the workpiece, the angle of inclination of the workpiece being such that the helical path of contact of the concave surface of the control wheel diagonally bridges the key-way and intersects the peripheral surface of the workpiece at the ends of the key-way on relatively opposite sides thereof to maintain constant control of rotation of the workpiece by the control wheel at uniform speed in contact with the face of the grinding wheel.

CECIL W. HOPKINS.

REFERENCES CITED

The following references are of record in the file of this patent:

UNITED STATES PATENTS

| Number | Name | Date |
| --- | --- | --- |
| 1,483,748 | Sandford | Feb. 12, 1924 |
| 1,585,983 | Heim | May 25, 1926 |
| 1,585,984 | Heim | May 25, 1926 |
| 1,639,958 | Norton | Aug. 23, 1927 |
| 2,073,079 | Theler et al. | Mar. 9, 1937 |
| 2,224,423 | Binns | Dec. 10, 1940 |
| 2,322,620 | Ekholm | June 22, 1943 |
| 2,402,454 | Scrivener | June 18, 1946 |

FOREIGN PATENTS

| Number | Country | Date |
| --- | --- | --- |
| 320,912 | Great Britain | Oct. 28, 1929 |